US008477656B2

(12) United States Patent
O'Mahony

(10) Patent No.: US 8,477,656 B2
(45) Date of Patent: *Jul. 2, 2013

(54) DISCOVERY TECHNIQUE FOR PHYSICAL MEDIA INTERFACE AGGREGATION

(75) Inventor: Barry A. O'Mahony, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/892,740

(22) Filed: Sep. 28, 2010

(65) Prior Publication Data

US 2011/0013540 A1    Jan. 20, 2011

Related U.S. Application Data

(63) Continuation of application No. 10/632,493, filed on Jul. 31, 2003, now Pat. No. 7,804,851.

(51) Int. Cl.
*H04L 12/28* (2006.01)

(52) U.S. Cl.
USPC ............................................. 370/254

(58) Field of Classification Search
USPC ..................... 370/254, 464, 465, 469
See application file for complete search history.

(56) References Cited

U.S. PATENT DOCUMENTS

| | | | |
|---|---|---|---|
| 5,959,968 | A | 9/1999 | Chin et al. |
| 6,094,683 | A | 7/2000 | Drottar et al. |
| 6,553,029 | B1 | 4/2003 | Alexander |
| 6,594,279 | B1 | 7/2003 | Nguyen et al. |
| 6,631,141 | B1 | 10/2003 | Kumar et al. |
| 7,308,612 | B1 | 12/2007 | Bishara |
| 2003/0167346 | A1 | 9/2003 | Craft et al. |
| 2004/0062198 | A1 | 4/2004 | Pedersen et al. |
| 2004/0068686 | A1 | 4/2004 | Palm |
| 2005/0265358 | A1 | 12/2005 | Mishra et al. |

OTHER PUBLICATIONS

"Series G: Transmission Systems and Media, Digital Systems and Networks: Handshake Procedures for Digital Subscriber Line (DSL) Transceivers," International Telecommunication Union, ITU-T, G.994.1, May 2003, pp. 1-159.

*Primary Examiner* — Chi Pham
*Assistant Examiner* — Robert Lopata
(74) *Attorney, Agent, or Firm* — Christopher K. Gagne

(57) ABSTRACT

Various discovery techniques are described for physical media interface aggregation.

21 Claims, 3 Drawing Sheets

DISCOVERY TECHNIQUE FOR PHYSICAL MEDIA INTERFACE AGGREGATION

BACKGROUND INFORMATION

Communication systems may communicate over a link, such as copper lines, coaxial cable, fiber optic lines and the like. In some cases, a plurality of links may be combined to form a logical link having a greater data rate. However, current techniques to perform link aggregation are inadequate. A need may exist for an improved technique to accomplish link aggregation.

DETAILED DESCRIPTION

Figure 1:
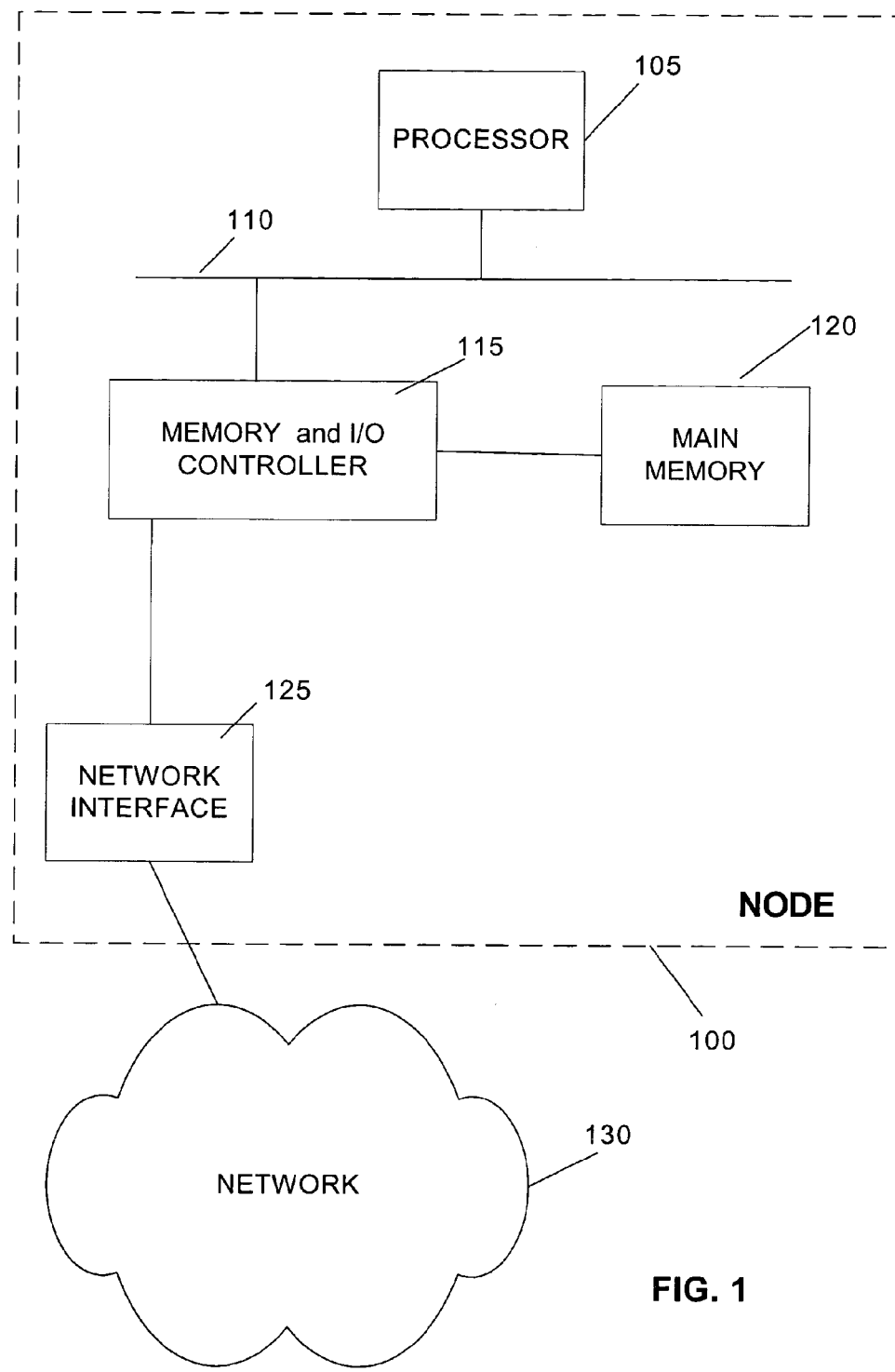
FIG. 1 is a diagram illustrating a node according to an example embodiment.

In the detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits and techniques disclosed herein may be used in many apparatuses, including a variety of nodes. A node, for example, may be any computing system, although the invention is not limited thereto. By way of example, a node may include a computer, a server, a bridge, a router, a switch, a wireless node such as a personal digital assistant (PDA), a cellular phone, a wireless node as part of an Institute of Electrical and Electronics Engineers (IEEE) 802.11 wireless LAN (WLAN) such as an 802.11 WLAN mobile or an 802.11 access point (AP).

A node may also comprise a modem, network interface controller and other devices to interface with a network, such as a telephone line (e.g., copper twisted pair lines), a digital subscriber line (DSL), an IEEE 802.3 Ethernet network, a local area network (LAN), an Asynchronous Transfer Mode (ATM) network, Internet Protocol (IP) network, a cable network, and the like. The nodes may communicate over a variety of media, such as copper twisted pair lines or conductors, coaxial cable, fiber optic lines, wireless channels, etc. In an example embodiment, the circuits and techniques described herein may be provided within a cable modem, a DSL modem, an Ethernet network interface controller (NIC), and the like.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example.

Referring to the Figures in which like numerals indicate like elements, FIG. 1 is a diagram illustrating a node according to an example embodiment. In this illustrative embodiment, a node 100 may include, for example, a processor 105 to execute instructions and software. The processor may be coupled to a memory and input/output (I/O) controller 115 via a host bus 110. Memory and I/O controller may control main memory 120 and may control a variety of different I/O interfaces. A network interface 125 is coupled to the memory and I/O controller 115 to interface node 100 to a network 130.

Figure 2:
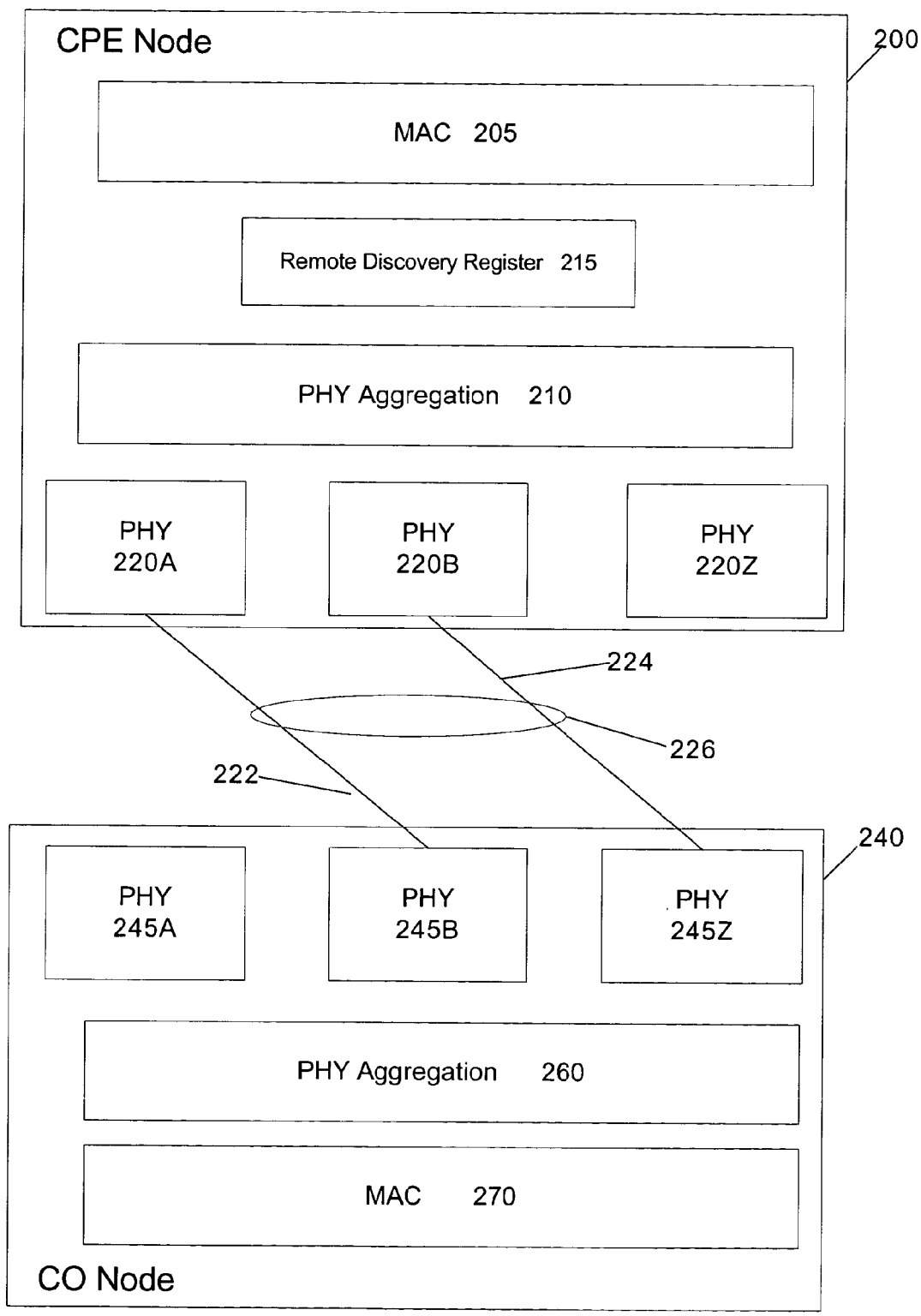
FIG. 2 is a block diagram illustrating a system according to an example embodiment.

FIG. 2 is a block diagram illustrating a system according to an example embodiment. A customer premises equipment (CPE) node 200 (customer node) may be provided, and may also be referred to as a subscriber node. CPE node 200 may include a processor, memory and the like.

CPE 200 may also include a media access control (MAC) 205 to handle tasks related to media access. CPE 200 may include at least one physical media interface (PHY) 220 coupled to MAC 205, such as PHYs 220A, 220B and 220B. PHYs 220 may, for example, generate signals having the timing and electrical qualities that may be appropriate for transmission over a particular physical media or link. According to an example embodiment, PHY 220 may include a physical media dependent (PMD), although the invention is not limited thereto. PHY 220A may be coupled to a link 222, while PHY 220B may be coupled to a link 224. While three PHYs are illustrated in CPE node 200, CPE node 200 may include any number of PHYs.

CPE 200 may also include a PHY aggregation 210 to assist in aggregating at least two PHYs into a single logical link. As shown in FIG. 2, PHYs 220A and 220B, for example, may be aggregated to form a single logical link 226, although the invention is not limited thereto. For example, five 2 Mb/s PHYs may be advantageously combined to form a single logical link have a data rate of 10 Mb/s. According to an example embodiment, up to 32 PHYs may be aggregated to form a single logical link.

CPE node 200 may also include at least one remote discovery register (RDR) 215. RDR 215 may be a readable and writeable register that may be used to facilitate PHY aggregation. In an example embodiment, there may be an RDR 215 for each MAC (such as MAC 205), although the invention is not limited thereto. There may be at least one PHY 220 corresponding to a RDR 215. For instance, PHYs 220A, 220B and 220Z may correspond to RDR 215.

In another embodiment, a CPE node may include a plurality of MACs, each with a corresponding RDR. A different group of PHYs at a CPE node may correspond to each RDR, although the invention is not limited thereto.

A central office (CO) node 240 may be a node located near a central office, although the invention is not limited thereto. The central office may be, for example, a telephone network central office, a Digital Subscriber Line (DSL) service central office, a headend at a data over cable network service, and the like. While a CPE node 200 and a CO node 240 are shown in FIG. 2, the invention is not limited thereto. Other types of nodes may be used.

CO node 240 may include a MAC 270, a PHY integration 260 to assist the CO node in controlling PHY aggregation. CO node 240 may include at least one physical media interface (PHY) 245 coupled to MAC 270, including PHYs 245A, 245B and 245Z, for example.

Although not shown in FIG. 2, both CPE node 200 and CO node 240 may include a processor, memory and other components typically found in a node or computing system.

In an example embodiment, an RDR 215 that is clear (e.g., having a value of zero) may indicate that the at least one corresponding PHY is not currently allocated for PHY aggregation, and thus, may be available for PHY aggregation. On the other hand, an RDR 215 that is not clear (e.g., having any value other than zero), may indicate that the corresponding PHY(s) is currently allocated for PHY aggregation. However, other values may be used in RDR 215 to indicate availability to be aggregated, and the invention is not limited thereto.

In an example embodiment, each CO node 240 may send a message to CPE node 200 to write a value (an Aggregation Discovery Code) to an RDR 215 to allocate the corresponding PHY(s) 220 for aggregation. The Aggregation Discovery Code written to RDR 215 may be assigned by the CO node 240, and may be a unique or different value for each CO node, although the invention is not limited thereto. A unique Aggregation Discovery Code (e.g., a unique or different value for each CO node) written to RDR 215 may also assist in locking out (e.g., preventing) other CO nodes from subsequently writing to that RDR, although the invention is not limited thereto. This lockout mechanism (e.g., based on the use of an Aggregation Discovery Code written to the RDR 215), therefore, may prevent a second CO node from attempting to allocate a PHY for aggregation that has already been allocated for PHY aggregation by a first CO node.

In an example embodiment, each CO node may, for example, write a MAC address of its MAC (e.g., Ethernet MAC address of MAC 270) to an RDR 215 to allocate the corresponding PHY to PHY aggregation and lock out other CO nodes from aggregating the corresponding PHY, although the invention is not limited thereto. Many different values may be written to the RDR 215.

According to example embodiments, PHYs 220 and 245 may comprise, for example, 2BASE-TL and 10PASS-TS PHYs to be used over twisted pair copper wires, although the invention is not limited thereto. These PHYs are merely illustrative. Other types of PHYs and media may be used.

PHY aggregation, also referred to as link aggregation or loop aggregation, may allow multiple PHYs to be combined together to form a single higher speed link. According to an example embodiment, PHY aggregation may be accomplished through a discovery procedure between a CO node 240 and a CPE node 200. The discovery procedure may allow the CO node 240 to determine the PHY aggregation capabilities of a CPE node (e.g., whether a PHY has already been allocated for aggregation) by examining and manipulating (e.g., reading and writing) the contents of the CPE node's remote discovery register (RDR) 215.

According to an example embodiment, a PHY aggregation discovery procedure may be accomplished through the exchange of handshaking messages provided by International Telecommunication Union-T (ITU-T) Recommendation G.994.1, "Handshake Procedures for Digital Subscriber Line Transceivers ("G.994.1"), although the invention is not limited thereto. G.994.1, for example, defines a CL (capabilities list) message that may be sent by a CO node to convey a list of capabilities, modes or features. G.994.1 also defines a CLR (capabilities list+request) that may be sent by a CPE node to convey a list of capabilities, modes or features, and to request a CL message from the CO node.

According to an example embodiment, additional control fields/control bits may be added to the G.994.1 CL and CLR messages to facilitate the manipulation of a CPE node's RDR for aggregation discovery. Table 1 illustrates additional control fields/bits related to aggregation discovery control that may be used according to an example embodiment. These fields are merely an illustrative embodiment, and other fields may be used.

TABLE 1

| Name | Description |
|---|---|
| Aggregation Discovery Code | e.g., a 48-bit code |
| PHY aggregation discovery | 0 = no PHY aggregation action being performed |
| | 1 = an action related to PHY aggregation is being performed |
| Discovery Operation | 01 = Ready (default) |
| | 00 = Set if clear |
| | 11 = Clear if same |
| Discovery Operation Result | 0 = discovery operation completed successfully (default) |
| | 1 = operation unsuccessful |

The Aggregation Discovery Code may be a value, for example, assigned by a CPE node to be written to a RDR 215 (at least under some circumstances). As noted above, the Aggregation Discovery Code may a unique value in that it may be unique for each CO node (e.g., each CO node may use a different Aggregation Discovery Code), although the invention is not limited thereto. According to an example embodiment, a CO node 240 may use the Ethernet MAC address of its MAC 270 as its Aggregation Discovery Code, since the Ethernet Address may be a unique value for each MAC, although the invention is not limited thereto. In an example embodiment, the Aggregation Discovery Code may be 48 bits, although any size may be used.

The PHY Aggregation Discovery field (bit) may be set to a one to indicate that an action is being performed on the CPE node related to PHY aggregation, or a 0 to indicate that the no action related to PHY aggregation is being performed (e.g., current message may be a null action).

The Discovery Operation field (bits) may be used by a CO node 240 to query and manipulate the remote discovery register (RDR) 215 of a CPE node 200. The default state of the Discovery Operation field may be "Ready" and may, for example, indicate that the CO node is capable of performing an operation on the RDR 215.

A CO node 240 may set the Discovery Operation field to "Set if clear" to conditionally set the value of an RDR. A CO node 240 may send a CL message including an Aggregation Discovery Code (e.g., its MAC address) and the Discovery Operation field set to "Set if clear." In response to receiving this CL message, the PHY aggregation 210 at a CPE node 200 may perform the following:

1) read or query the contents of the RDR 215;
2) conditional write: write or set the value of the RDR 215 to the Aggregation Discovery Code only if the RDR 215 is clear (e.g., 0x000000000000).

According to an example embodiment, RDR 215 should be clear if the PHY is not currently allocated for PHY aggregation. Therefore, using a "set if clear" operation that first checks that the RDR is clear first before writing to it may prevent multiple CO nodes from writing to the same RDR. Therefore, the use of an RDR with a read-conditional write mechanism, for example as described above, may be used to allow only one CO node at a time to allocate a PHY for aggregation, and may lockout other CO nodes after the RDR has been set to any non-cleared value.

A CO node may set the Discovery Operation field to "clear if same" in order to conditionally clear the RDR 215. For example, a CO node 240 may have initially set an RDR, and then aggregated the PHY with another PHY to form a logical link for communication. After the communication session has ended, the CO node may de-allocate the PHY to allow the PHY to be allocated for aggregation by other CO nodes. To do this, according to an example embodiment, the CO node 240 may send a CL message to the CPE node 200, with the Discovery Operation field set to "clear if same", and providing the CO node's Aggregation Discovery Code. Upon receiving this CL message, the PHY Aggregation 210 may perform the following:

1) read or query the contents of the RDR 215;
2) compare the contents of the RDR to the Aggregation Discovery Code; and
3) conditional write: Clear the RDR 215 only if the contents of the RDR 215 match the Aggregation Discovery Code provided by the CO node.

Therefore, the use of such a "clear if same" command that uses a read-conditional write mechanism, for example as described above, may be used to ensure that only the CO node that currently has allocated a PHY (written to the RDR) may de-allocate the PHY (clear the RDR), although the invention is not limited thereto.

The Discovery Operation Result field is optional, and according to an example embodiment, may be used by the CPE node (e.g., in a subsequent CLR message) to indicate the success or failure of a discovery operation. In an example embodiment, the Discovery Operation Result may be a zero to indicate that a discovery operation completed successfully (default). The Discovery Operation Result may be set to a 1 to indicate a failure of a discovery operation. For instance, the Discovery Operation Result field may be set to 1 if:

1) a link is down; or
2) a "set if clear" operation was requested but the RDR was not clear; or
3) a "clear if same" operation was requested but the RDR did not match the Aggregation Discovery Code provided by the CO node.

These are just a few examples, and the invention is not limited thereto.

Figure 3:
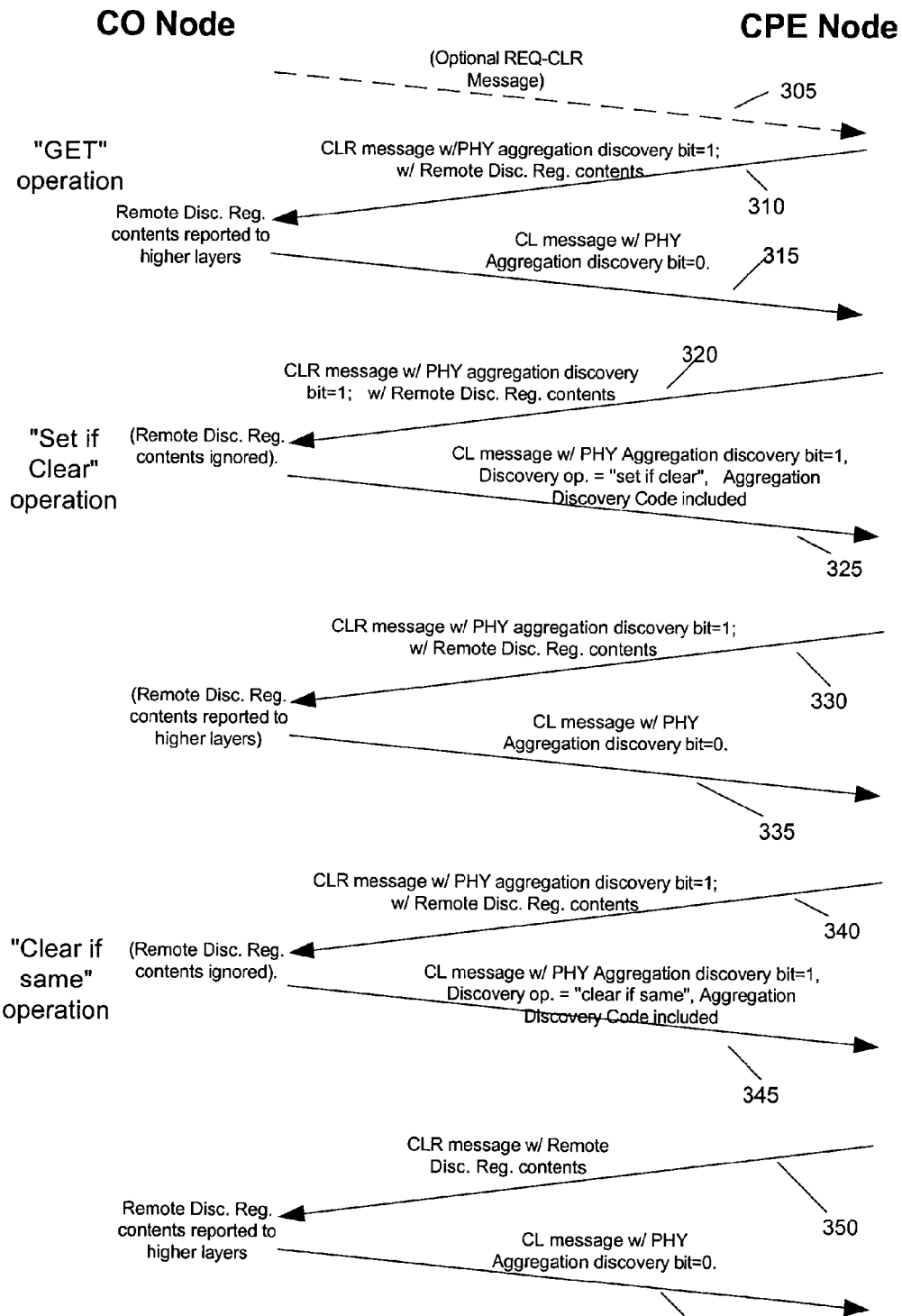
FIG. 3 is a diagram illustrating operation of a system according to an example embodiment.

FIG. 3 is a diagram illustrating operation of a system according to an example embodiment. Several examples of handshaking between a CO node 240 and a CPE node 200 are shown. Example handshaking/message exchanges are shown for several operations, such as for a "Get" operation, for a "Set if clear" operation, and a "Clear if same" operation. Each of these operations may be accomplished through, for example, a capabilities exchange between a CO node 240 and a CPE node 200. In an example embodiment, a capabilities exchange may be performed by exchanging G.994.1 CL and CLR messages. A G.994.1 capabilities exchange may include, for example, a CLR message sent from the CPE node 240 and a reply CL message sent from the CO node 200. According to an example embodiment, these CL and CLR messages may include a number of fields, such as the fields described in Table 1, to allow a CO node 240 to examine and manipulate (e.g., read or write) the contents of an RDR 215 at a remote CPE node 200. As shown in the example embodiments of FIG. 3, two back-to-back capabilities exchanges may be used, for example, to perform the "Set if clear" and "Clear if same" operations, although the invention is not limited thereto.

According to an example embodiment, to accomplish a "Get" operation, a CO node 240 may, for example, send a REQ-CLR message 305 to request a capabilities list from the CPE node 200, although the invention is not limited thereto. The CPE node 200 may reply with a CLR message 310 with the PHY aggregation discovery bit set to 1 (indicating that the message relates to PHY aggregation discovery), and includes the contents of the RDR 215. The CPE node may, alternatively, reply with message 310 during a handshaking exchange with CO node 240. Upon receiving message 310, the CO node 240 may then read or examine the received contents of the RDR 215 from the CPE node 200. In reply to message 310, CO node 240 may send a CL message 315 to complete the capabilities exchange, where the PHY Aggregation discovery bit set to zero (e.g., indicating a null action for this message). This illustrates an example of how a CO node 240 may obtain (e.g., Get) the contents of a CPE node's RDR 215, although the invention is not limited thereto. For example, in another embodiment of the Get operation, a CPE node 200 may send a CLR message 310 without being prompted by a REQ-CLR message from the CO node. This is yet another example embodiment.

According to an example embodiment, to accomplish a "set if clear" operation, in response to a CLR message 320 from CPE node (e.g., during handshaking), CO node 240 may send a CL message 325 in which the PHY Aggregation Discovery bit is set to a 1, the Discovery Operation field is set to "Set if clear", and may include an Aggregation Discovery Code from the CO node. Upon receipt of message 325, the PHY aggregation 210 at the CPE node 200 may write the Aggregation Discovery Code to the RDR 215 only if the RDR is clear, according to an example embodiment, although the invention is not limited thereto. The CPE node 200 may then send a CL message 330, including the new contents of the RDR 215. The CO node 245 may then read or examine the new contents of the RDR to confirm that that RDR 215 was set to the aggregation discovery code, or not. In another embodiment, message 330 may optionally include the result of the "set if clear" operation, provided as the Discovery Operation Result (e.g., a zero if Aggregation Discovery Code was successfully written to RDR 215, otherwise set to one), although the invention is not limited thereto. The CO node 240 may then reply with a CL message 335 to complete the capabilities exchange, with PHY Aggregation Discovery bit set to zero (e.g., indicating a null action for this message).

According to an example embodiment, to accomplish a "Clear if same" operation" in response to a CLR message 340 from the CPE node 200, a CO node may send a CL message 345 that includes the Discovery Operation field set to "Clear if same", PHY aggregation discovery bit set to 1, and providing the Aggregation Discovery Code. Upon receipt of the CL message 345, the PHY aggregation of CPE node 200 may compare the received Aggregation Discovery Code to the contents of the RDR 215. PHY aggregation 210 may then clear the RDR 215 only if there is a match, although the invention is not limited thereto. The CPE node 200 may then send a CLR message 345 including the new contents of the RDR. CO node 245 may read the new contents of the RDR 215 to confirm that the RDR was cleared. In another embodiment, message 345 may optionally include the result of the "Clear if same" operation as the Discovery Operation Result (e.g., zero if successfully cleared the RDR 215, otherwise set to 1 to indicate an unsuccessful operation), although the invention is not limited thereto. The CO node 240 may then send a CL message 355 to complete this capabilities exchange.

In another embodiment, a CO node 240 may set the RDR of a CPE node (thereby allocating to aggregation the at least one PHY corresponding to the RDR 215). However, there may be multiple MACs at a CPE, and as a result, it may not be clear that all PHYs at a CPE node have been allocated for aggregation. In order to confirm which PHYs have been allocated to aggregation, according to an example embodiment, the CO node may perform a "set if clear" operation on each of the PHYs. In yet another example embodiment, the CO node 240 may perform a "set if clear" operation on at least one of the PHYs (thereby setting the value of the corresponding MAC to the CO node's aggregation discovery code), and then confirm PHY allocation by performing a "Get" operation on each of the PHYs. However, these are simply additional embodiments, and the invention is not limited thereto.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
receiving, at a central office (CO) node, a capabilities list+request (CLR) message, from a customer premise equipment (CPE) node, the CLR message including an aggregation discovery code, the CPE including a remotely manipulated remote discovery code register, the CLR message including the contents of the CPE's remote discovery register, the contents of the CPE's remote discovery register indicating whether a physical media interface (PHY) of the CPE has been allocated to aggregation, the CO node being capable of issuing to the CPE node a capabilities list (CL) message; and
comparing contents of the CPE's remote discovery register to the aggregation discovery code.

2. The method of claim 1, wherein the PHY is a 2BASE-TL PHY.

3. The method of claim 1, wherein the PHY is a 10PASS-TS PHY.

4. The method of claim 1, wherein the CLR message is a G994.1 CLR handshaking message used for aggregation discovery.

5. The method of claim 1, wherein the aggregation discovery code is a Media Access Control (MAC) address of the CO node.

6. The method of claim 1, further comprising:
sending the CL message, from the CO node to the CPE node, a discovery operation field in the CL message set to "set if clear" to conditionally set the CPE's remote discovery register to the aggregation discovery code.

7. The method of claim 1, further comprising:
sending the CL message, from the CO node to the CPE node, a discovery operation field in the CL message set to "clear if same" to conditionally clear the CPE's remote discovery register if the aggregation discovery code stored in the CPE's remote discovery register matches a first aggregation discovery code included in the CL message.

8. A method comprising:
sending, at a customer premise equipment (CPE) node, a capabilities list+request (CLR) message, to a central office (CO) node, the CLR message including an aggregation discovery code, the CPE including a remotely manipulated remote discovery code register, the CLR message including the contents of the CPE's remote discovery register, the contents of the CPE's remote discovery register indicating whether a physical media interface (PHY) of the CPE has been allocated to aggregation; and receiving, by the CPE, a capabilities list (CL) message, from the CO node.

9. The method of claim 8, wherein the PHY is a 2BASE-TL PHY.

10. The method of claim 8, wherein the PHY is a 10PASS-TS PHY.

11. The method of claim 8, wherein the CLR message is a G994.1 CLR handshaking message used for aggregation discovery.

12. The method of claim 8, wherein the aggregation discovery code is a Media Access Control (MAC) address of the CO node.

13. The method of claim 8, wherein a discovery operation field in the CL message set to "set if clear" to conditionally set the CPE's remote discovery register to the aggregation discovery code.

14. The method of claim 8, wherein, a discovery operation field in the CL message set to "clear if same" to conditionally clear the CPE's remote discovery register if the aggregation discovery code stored in the CPE's remote discovery register matches a first aggregation discovery code included in the CL message.

15. An apparatus comprising:
a physical media interface (PHY);
a remotely manipulated discovery code register; and
logic to send a capabilities list+request (CLR) message, to a central office (CO) node, the CLR message including an aggregation discovery code, the CLR message including the contents of the remote discovery register, the contents of the remote discovery register indicating whether the PHY of the CPE has been allocated to aggregation and to receive a capabilities list (CL) message, from the CO node.

16. The apparatus of claim 15, wherein the PHY is a 2BASE-TL PHY.

17. The apparatus of claim 15, wherein the PHY is a 10PASS-TS PHY.

18. The apparatus of claim 15, wherein the CLR message is a G994.1 CLR handshaking message used for aggregation discovery.

19. The apparatus of claim 15, wherein the aggregation discovery code is a Media Access Control (MAC) address of the CO node.

20. The apparatus of claim 15, wherein a discovery operation field in the CL message set to "set if clear" to conditionally set the remote discovery register to the aggregation discovery code.

21. The apparatus of claim 15, wherein, a discovery operation field in the CL message set to "clear if same" to conditionally clear the remote discovery register if the aggregation discovery code stored in the CPE's remote discovery register matches a first aggregation discovery code included in the CL message.

* * * * *